United States Patent
Giddons

[11] Patent Number: 6,135,537
[45] Date of Patent: Oct. 24, 2000

[54] REINFORCED VEHICLE DOOR ASSEMBLY

[75] Inventor: Nigel Giddons, Troy, Mich.

[73] Assignee: Chrysler Corporation, Auburn Hills, Mich.

[21] Appl. No.: 08/996,437

[22] Filed: Dec. 22, 1997

[51] Int. Cl.[7] .................................................. B60J 5/04
[52] U.S. Cl. ......................................................... 296/146.6
[58] Field of Search ........................... 49/502; 296/146.6, 296/188, 189

[56] References Cited

U.S. PATENT DOCUMENTS

| | | | |
|---|---|---|---|
| 3,782,036 | 1/1974 | Clark et al. ................................. | 49/502 |
| 4,434,580 | 3/1984 | Engelsberger et al. .................... | 49/502 |
| 4,702,040 | 10/1987 | Hellriegel .................................. | 49/502 |
| 4,944,553 | 7/1990 | Medley et al. . | |
| 5,505,024 | 4/1996 | DeRees et al. . | |
| 5,544,930 | 8/1996 | Stedman . | |
| 5,555,677 | 9/1996 | DeRees et al. . | |
| 5,570,922 | 11/1996 | DeRees et al. . | |
| 5,573,297 | 11/1996 | DeRees et al. . | |
| 5,599,057 | 2/1997 | Hirahara et al. ...................... | 296/146.6 |
| 5,908,216 | 6/1999 | Townsend ............................. | 296/146.6 |

*Primary Examiner*—D. Glenn Dayoan
*Assistant Examiner*—Mickki D. Murray
*Attorney, Agent, or Firm*—Donna L. Berry

[57] ABSTRACT

A reinforced vehicle door assembly more efficiently manages side impact energy by transferring the impact energy through door hinge assemblies to the vehicle frame. The door frame assembly preferably includes first and second reinforcement members or intrusion beams which are attached directly to hinge assemblies. The hinge assemblies have a first hinge member adapted for fixed attachment to the vehicle frame. A second hinge member is pivotally attached to the first hinge member and fixedly attached to a tapping plate. The tapping plate is in turn fixedly attached to the frame of the door. One end of both of the reinforcement members is fixedly attached to an associated one of the mounting plates.

17 Claims, 2 Drawing Sheets

REINFORCED VEHICLE DOOR ASSEMBLY

BACKGROUND OF THE INVENTION

1. Technical Field

The present invention generally relates to motor vehicles. More particularly, the present invention relates to a method and apparatus for reinforcing a door of a motor vehicle which more efficiently transfers impact energy to the vehicle frame.

2. Discussion

Structural reinforcements are commonly employed within motor vehicle doors to provide an increased level of protection against intrusion into the passenger compartment during a side impact collision. Such structural reinforcements are commonly referred to as "intrusion beams". Common forms of known intrusion beams range from tubular members which horizontally extend between inner and outer panels of a vehicle door to metal stampings welded to the frame of the door.

One specific structural reinforcement for a vehicle door is shown and described in commonly assigned U.S. Pat. No. 5,544,930 to Stedman. This patent describes a structural reinforcement having an energy absorbing tubular bar supported by first and second brackets. The tubular bar extends substantially across a length of the vehicle door approximately parallel to a lower edge of the door. The tubular bar has a first end and a second end and a longitudinal axis passing through the first and second ends. The first bracket retains the first end of the tubular bar such that there is a predetermined amount of rotational float between the first bracket and the first end of the bar. The second bracket has a seat portion receiving and affixed to the second end of the bar. U.S. Pat. No. 5,544,930 is incorporated by reference as if fully set forth herein.

While the arrangement shown and described in U.S. Pat. No. 5,544,930 and many other prior known arrangements have proven to be commercially acceptable for their intended applications, they are all subject to improvement. In this regard, it is desirable to improve side impact energy management by transferring the impact energy more effectively from a structural reinforcing member to a vehicle frame through one or more door hinges.

SUMMARY OF THE INVENTION

It is a principal object of the present invention to provide an apparatus for reinforcing a vehicle door which functions to reduce intrusion into the passenger compartment in the event of a side impact collision.

It is a related object of the present invention to provide a vehicle door assembly which improves side impact energy management by transferring impact energy received by the door through the door hinges and to the vehicle frame.

It is another object of the present invention to provide a reinforced door for a motor vehicle which more effectively transfers energy to the vehicle frame and thereby permits an inner panel of the assembly to be at least partially constructed from a lower gage material.

In one form, the present invention provides a reinforced door assembly for a motor vehicle including a vehicle frame. The reinforced door includes a door frame and a hinge assembly. The hinge assembly pivotally interconnects the door frame and the vehicle frame. The reinforced door assembly further includes a reinforcement member having a first end directly attached to the hinge assembly. Impact energy received by the reinforcement member during a side impact collision is at least partially transferred to the vehicle frame through the hinge assembly.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
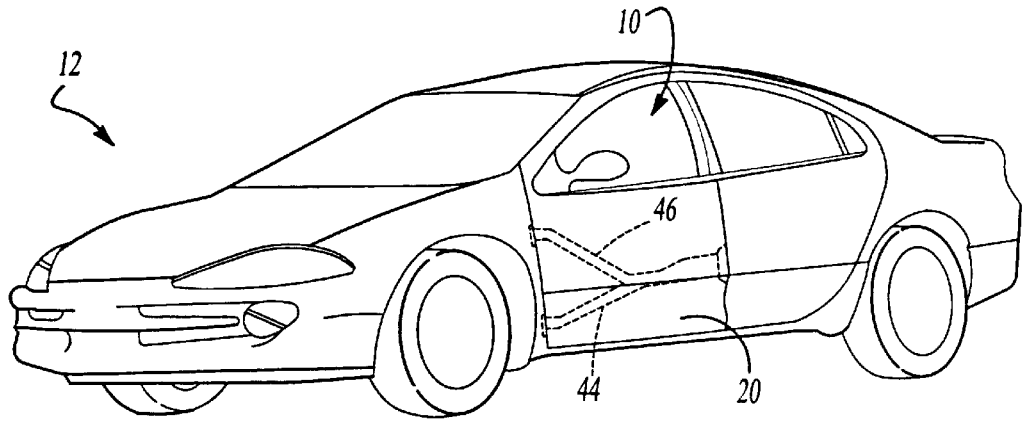
FIG. 1 is a perspective view of an exemplary motor vehicle shown incorporating a reinforced door assembly constructed in accordance with the teachings of a preferred embodiment of the present invention.

With reference to FIG. 1 of the drawings, a reinforced vehicle door constructed in accordance with the teachings of a preferred embodiment of the present invention is generally identified with reference numeral 10. The reinforced vehicle door assembly 10 is shown operatively installed within an exemplary motor vehicle 12. However, it will become apparent to those skilled in the art that the teachings of the present invention have applicability to a wide range of vehicles.

Figure 2:
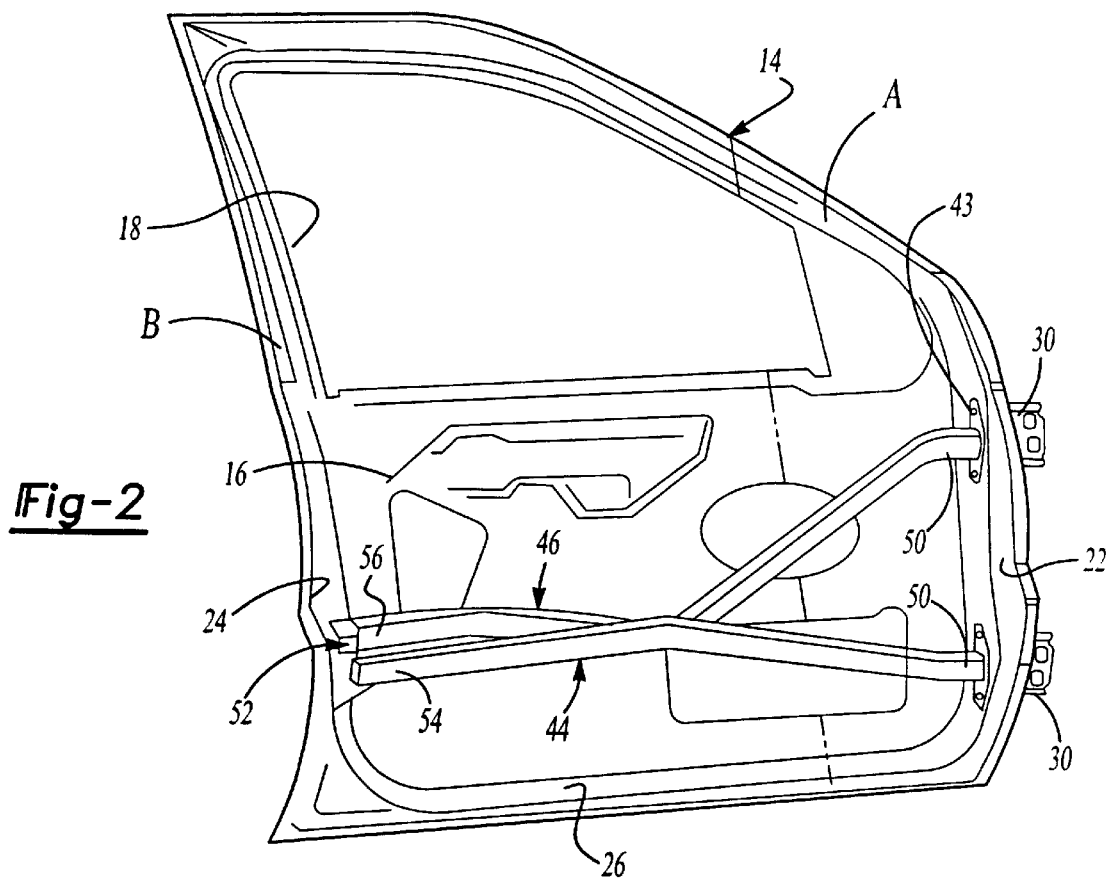
FIG. 2 is an enlarged view of a sub-assembly of the reinforced door assembly of FIG. 1.
Figure 3:
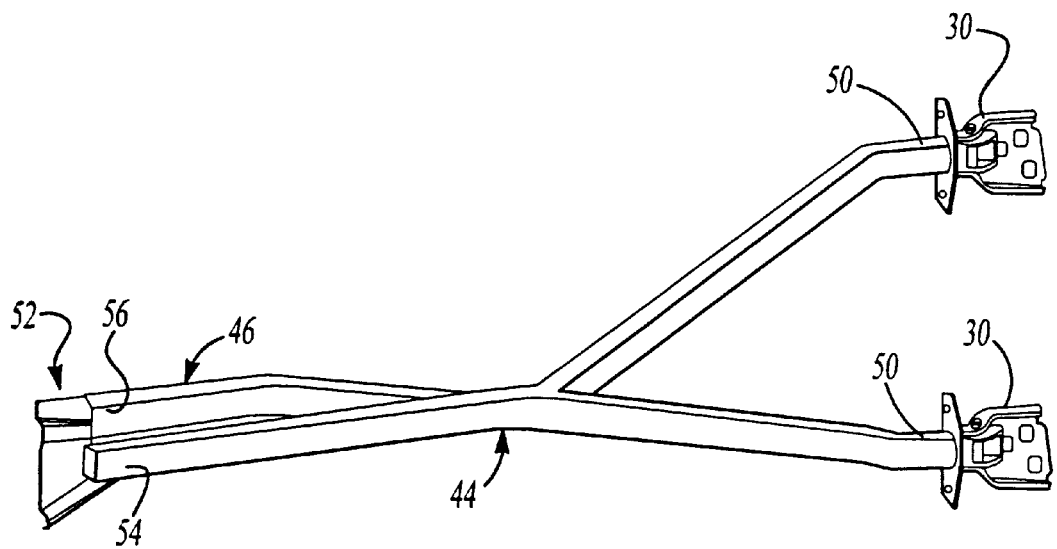
FIG. 3 is a further enlarged view of the reinforcement members and hinge assemblies of FIG. 2 illustrated removed from the sub-assembly for purposes of illustration.
Figure 4:
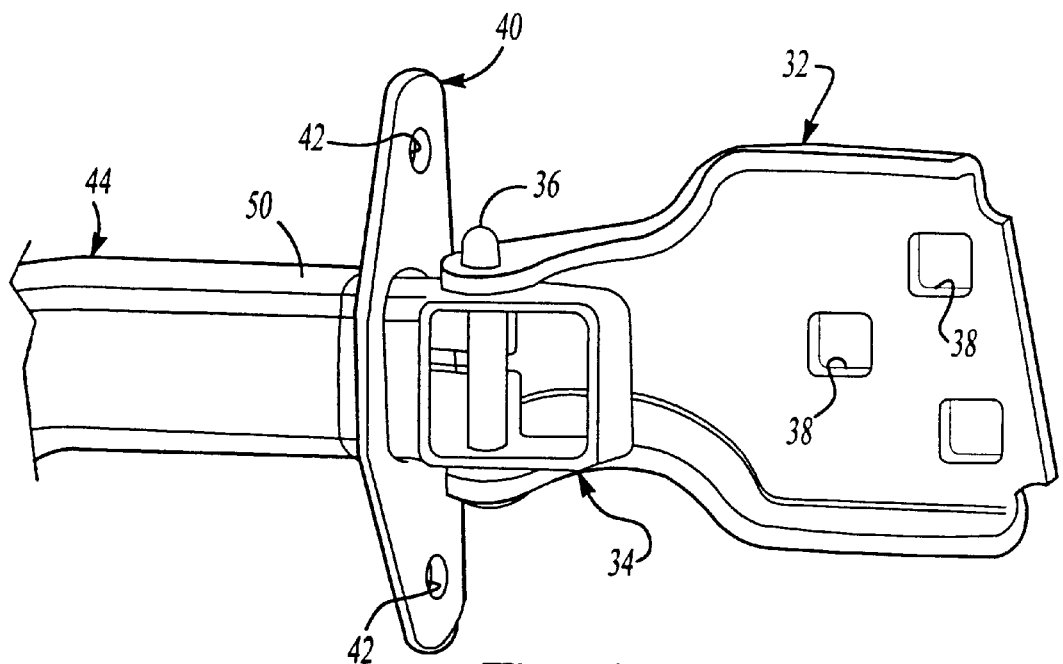
FIG. 4 is an enlarged perspective view of a hinge end of one of the reinforcement members of FIG. 3.

With continued reference to FIG. 1 and additional reference to FIGS. 2 and 3, the reinforced vehicle door assembly 10 of the present invention will now be described in greater detail. The reinforced vehicle door assembly 10 is illustrated to include a door frame 14 with an inner panel 16. In the exemplary embodiment illustrated, the inner panel 16 is formed by stamping a sheet of metal to define a shape corresponding to that of an opening (not specifically shown) in the vehicle 12 in which it will be incorporated. The inner panel 16 is formed to include a lower, generally rectangular portion and an upper, generally trapezoidal portion. The upper portion generally defines a window opening 18. The intersection of the upper and lower portions is commonly referred to as the belt-line. Below the belt-line, the inner panel 16 is typically provided with a plurality of openings for access to internal mechanisms such as window regulators and door latches (not shown) which are operatively disposed within the vehicle door assembly 10 between the inner panel 16 and an outer panel 20 (shown in FIG. 1, but removed for purposes of illustration in FIG. 2).

The door frame 14 is preferably formed to further include a front shut face or hinge shut face 22 and a rear shut face or latch shut face 24 connected by bottom flange member 26. The hinge and latch shut faces 22 and 24 and the bottom flange member 26 each intersect and are integrally formed with the inner panel 16. The hinge and latch shut faces 22 and 24 are disposed generally perpendicular to the inner panel 16.

The door assembly 10 further includes a pair of substantially identical hinge assemblies 30 which function to pivotally attach the door assembly 10 to the frame (not specifically shown) of the motor vehicle 12. Both of the hinge assemblies 30 include a first member or body leaf 32 and a second member or door leaf 34. The first and second members 32 and 34 are pivotally interconnected in a conventional manner by a hinge pivot pin 36. The body leaf 32 is formed to include a plurality of apertures 38 adapted to receive fasteners (not shown) for fixed attachment to the frame of the vehicle 12. Alternatively, it will be understood that the first members 32 may be welded or otherwise suitably fastened to the frame of the vehicle 12.

Each of the hinge assemblies 30 is further shown to include a tapping plate 40 for interconnecting the associated door leaf 34 to the door frame 14. Each tapping plate 40 includes a plurality of holes 42 for receiving fasteners 43 (shown in FIG. 2) which are in turn received in apertures (not shown) provided in the hinge shut face 22. The door leaf 34 is gas welded or otherwise suitably attached to the tapping plate 40 and extends through an aperture (not shown) in the hinge shut face 22. Alternatively, while not preferred due to manufacturing limitations, it will be understood that the door leaf 34 may be integrally formed with the tapping plate 40.

The reinforced door assembly 10 is shown to further include first and second reinforcement members or intrusion beams 44 and 46. The first and second reinforcement members 44 and 46 are generally adapted to be mounted within the frame 14 of the door assembly 10 and further protect vehicle occupants from side impact collisions by transferring impact energy to the frame 14 of the vehicle 12 through the hinge assemblies 30. The first and second reinforcement members 44 and 46 both include a first end 50 which is gas welded or otherwise suitably attached to an associated one of the tapping plates 40 and associated door leaf 34.

In the exemplary embodiment illustrated, the first and second reinforcement members 44 and 46 are hydro-formed, high strength steel tubes having a cross section which is closed and substantially rectangular. However, it will be appreciated by those skilled in the art, that the particular intrusion beams 44 and 46 illustrated are exemplary in nature. In this regard, the cross-sectional shape can be varied as required by specific applications. Additionally, in certain applications, it may be desirable to incorporate a stamped beam having a substantially flat cross section or other opened cross section. Insofar as the scope of the present invention is concerned, the significant factor is that the intrusion beams 44 and 46 transfer impact energy through the hinge assemblies 30 to the vehicle frame.

The reinforced door assembly 10 of the present invention is further shown to include a bracket 52 receiving a second end 54 of the first reinforcement member 46. In the exemplary embodiment illustrated, the bracket 52 also functions to receive a second end 56 of the second reinforcement member 46. In this regard, the first and second reinforcement members 44 and 46 effectively converge from their associated hinge assembly 30 to the common bracket 52. The second ends 54 and 56 are mig welded or otherwise suitable fastened to the bracket 52 which is then in turn welded or otherwise suitably fastened to the inner panel 16 of the frame 14.

In the embodiment illustrated, the second reinforcement member 46 is configured such that a central portion thereof is located horizontally behind the first reinforcement member 44. For additional strength, the first and second reinforcement members 44 and 46 are mig welded or otherwise suitably fastened in this area. It is important to appreciate that the specific configuration for the first and second reinforcement members 44 and 46 can be contributed in large part to the exemplary door frame 14 as shown in the drawings. In this regard, it must be again emphasized that the shape of the first and second reinforcement members 44 and 46 and the relative locations thereof within the door assembly 10 are largely matters of design choice which may be modified for particular applications.

In a manner known in the art, the frame 14 of the door assembly 10 is vertically divided into two portions A and B having different gauges of the material. In this regard, the portion A of the frame 14 adjacent the hinge assemblies 10 is conventionally constructed of a thicker gauge steel compared to the remaining portion B of the frame 14. The up-gauging of the steel accommodates increased forces experienced due to the load bearing nature of the hinge assemblies 30. The transfer of impact energy through the hinge assemblies 30 allows the gauge of material incorporated into the portion A of the frame 14 adjacent the hinge assemblies 30 to be reduced.

In one particular application, the gauge of the portion A of the adjacent hinge assemblies is approximately 1 mm and the gauge of the other portion B of the frame 14 is approximately 0.66 mm. The reduction in material gauge is possible as the structural effect of the first and second reinforcement members 44 and 46 on vertical loads is reduced as they minimally contribute to the vertical loads applied at areas of the frame 14 adjacent the hinge assemblies 30.

While the above description constitutes the preferred embodiment of the invention, it will be appreciated that the invention is susceptible to modification, variation, and change without departing from the proper scope or fair meaning of the accompanying claims. For example, certain applications may incorporate only a single reinforcement member for transferring impact energy through one of the hinge assemblies 30. It is anticipated that the subject invention may be incorporated into vehicle doors other than passenger doors, including but not limited to liftgates, tailgates, and the like.

What is claimed is:

1. A reinforced door assembly for a motor vehicle, the motor vehicle including a vehicle frame, the reinforced door comprising:

a door frame;

a hinge assembly operable for pivotally interconnecting the door frame and the vehicle frame, the hinge assembly including a body leaf pivotally connected to a door leaf wherein said hinge assembly includes a first member fixedly attached to the vehicle frame and a second member fixedly attached to the door frame, said first and second members being pivotally interconnected;

a reinforcement member having a first end directly attached to said hinge assembly such that said door leaf is aligned with a longitudinal axis of the reinforcement member; and whereby impact energy received by said reinforcement member during a side impact collision is at least partially transferred to the vehicle frame through the hinge assembly.

2. A reinforced door assembly for a motor vehicle having a vehicle frame, the reinforced door assembly comprising:

a door frame having an inner panel and a hinge shut face disposed generally perpendicular to said inner panel;

first and second hinge assemblies; and first and second intrusion beams both having first ends directly attached to said first and second hinge assemblies, respectively, said first and second intrusion beams being at least partially disposed within a common horizontal plane;

whereby impact energy received by said first and second intrusion beams during a side impact collision is at least partially transferred to the frame through the first and second hinge assemblies, respectively.

3. The reinforced door assembly for a motor vehicle of claim 1, wherein said reinforcement member horizontally extends substantially across the entire length of said door frame.

4. The reinforced door assembly for a motor vehicle of claim 1, wherein said reinforcement member is an intrusion having a closed cross-section.

5. The reinforced door assembly for a motor vehicle of claim 1, wherein said door frame includes an inner panel and further comprising a mounting plate interconnecting said inner panel and a second end of said reinforcement member.

6. A reinforced door assembly for a motor vehicle having a vehicle frame, the reinforced door assembly comprising:

a door frame having an inner panel and a hinge shut face disposed generally perpendicular to said inner panel;

first and second hinge assemblies; and first and second intrusion beams both having first ends directly attached to said first and second hinge assemblies, respectively, said first and second intrusion beams being at least partially disposed within a common horizontal plane;

whereby impact energy received by said first and second intrusion beams during a side impact collision is at least partially transferred to the frame through the first and second hinge assemblies, respectively.

7. The reinforced door for a motor vehicle of claim 6, wherein both of said first and second hinge assemblies include a tapping plate fixedly attached to said hinge shut face.

8. The reinforced door for a motor vehicle of claim 7, wherein said first and second intrusion beams both horizontally extend substantially across the entire length of said inner panel.

9. The reinforced door for a motor vehicle of claim 7, wherein both of said first and second intrusion beams include a first hinge assembly member fixedly attached to the vehicle frame and a second hinge assembly member fixedly attached to said door frame, said first and second hinge assembly members being pivotally interconnected.

10. The reinforced door for a motor vehicle of claim 6, wherein a second end of both of said first and second intrusion beams is fixedly interconnected to said door frame.

11. The reinforced door for a motor vehicle of claim 10, further comprising a common bracket interconnecting said second ends of said first and second intrusion beams to said door frame.

12. A reinforced door assembly for a motor vehicle having a vehicle frame, the reinforced door assembly comprising:

a door frame having an inner panel and a hinge shut face disposed generally perpendicular to said inner panel;

upper and lower hinge assemblies; and first and second intrusion beams both having first ends directly attached to said upper and lower hinge assemblies, respectively, wherein said first and second intrusion beams both horizontally extend substantially across the entire length of said inner panel, and said first and second intrusion beams are at least partially disposed within a common horizontal plane; and whereby impact energy received by said first and second intrusion beams during a side impact collision is at least partially transferred to the frame through the upper and lower hinge assemblies, respectively.

13. The reinforced door for a motor vehicle of claim 12, wherein both of said upper and lower hinge assemblies include a tapping plate fixedly attached to said hinge shut face.

14. The reinforced door for a motor vehicle of claim 13, wherein both of said first and second intrusion beams include a first hinge assembly member fixedly attached to the vehicle frame and a second hinge assembly member fixedly attached to said door frame, said first and second hinge assembly members being pivotally interconnected.

15. The reinforced door for a motor vehicle of claim 12, wherein a second end of both of said first and second intrusion beams is fixedly interconnected to said door frame.

16. The reinforced door for a motor vehicle of claim 15, further comprising a common bracket interconnecting said second ends of said first and second intrusion beams to said door frame.

17. The reinforced door for a motor vehicle of claim 12, wherein both of the upper and lower hinge assemblies includes a body leaf pivotally connected to a door leaf, each door leaf aligned with a longitudinal axis of an associated one of the first and second intrusion beams.

\* \* \* \* \*